United States Patent [19]
Negado

[11] 3,831,921
[45] Aug. 27, 1974

[54] COLLISION GUARD DEVICE
[76] Inventor: Cesar T. Negado, 25-12 169th St., Flushing, N.Y. 11358
[22] Filed: Apr. 13, 1973
[21] Appl. No.: 350,941

[52] U.S. Cl.................... 267/139, 293/64, 293/85, 293/87, 293/88
[51] Int. Cl............................................. B60r 19/08
[58] Field of Search............ 293/64, 65, 66, 85, 86, 293/87, 88, 91, 92, 93, 94; 267/33, 139, 140

[56] References Cited
UNITED STATES PATENTS

| | | | |
|---|---|---|---|
| 1,427,878 | 9/1922 | Weinberg | 293/87 |
| 1,498,038 | 6/1924 | Igo | 293/87 |
| 1,832,184 | 11/1931 | Christen | 293/85 |
| 1,839,015 | 12/1931 | Deveaux | 293/87 |
| 1,936,389 | 11/1933 | Hallquist | 267/33 |
| 2,049,210 | 7/1936 | Lindauer | 293/87 |

Primary Examiner—M. Henson Wood, Jr.
Assistant Examiner—Robert Saifer
Attorney, Agent, or Firm—Henry R. Lerner

[57] ABSTRACT

A collision guard unit, adapted for attachment to a surface to be protected, which comprises an impact loop having opposite ends which are affixed to the surface to be protected. Interposed between the inner side of the loop and the protected surface is an energy absorption assembly. A plurality of collision guard units may be connected to a pair of transverse members to enlarge the surface area that can be protected. The transverse members also serve to dissipate the impulsive force of a collision throughout the total system, thereby enhancing its overall efficiency.

6 Claims, 7 Drawing Figures

COLLISION GUARD DEVICE

BACKGROUND OF THE INVENTION

The present invention relates to collision guard systems and, more particularly, to protective guards for automobile bumpers.

As is well known, one of the major problems in today's highly mechanized and mobile society is the vast magnitude of property damage and personal injury that results from automobile accidents. This problem is partially due to certain design factors that have become widely and uncritically accepted by almost all auto manufacturers. More specifically, it is evident that most cars manufactured today, and to be manufactured in the foreseeable future, possess an essentially rectangular shape, with wheels located at each of the four corners of the rectangle. This particular geometry dictates that serious accidents will probably occur whenever the frontal planes of two automobiles collide. In addition, accidents of lesser, but yet significant magnitude, will occur whenever the frontal plane of one car strikes the rear plane of another car. Often, such collisions, even at speeds as low as 5 mph, can cause major property damage as well as personal injuries of particularized classes, such as whiplash and back disorders.

Accordingly, a preeminent need in the field of automobile safety has been that of providing a means by which the consequences of impacts of the above described type could be moderated in their severity.

The need for such a means has been nominally recognized by the auto industry as evidenced by the fact that bumpers and bumper guards have long been standard parts of every automobile. The difficulty, of course, has been that such bumpers and bumper guards have, to date, been wholly inadequate to their purported purposes. Consequently, it has become necessary for engineers to experiment with supplemental bumper guard systems that might perform the function which bumpers were orginally intended to perform.

The present invention can, in the first instance, be viewed as such a supplemental bumper guard system. Beyond this, however, the prospective applications of the present bumper system cannot be limited to the automotive field. It may, for example, find use as a docking guard at a pier, a highway divider, a train stop guard, a garage wall protector, a boat collision guard, or a loading dock guard.

SUMMARY OF THE INVENTION

An object of the present invention is to provide motor vehicles with a means of protection against damage from front and rear-end collisions.

A further object is to reduce the possibility of injury to passengers of a vehicle involved in such a collision.

A yet further object is to provide a generalized impact absorption means that can be used to protect any of a plurality of different types of surfaces from impacts.

The above objects are attained through the use of a collision guard system that (1) distributes the impact force over a wide area, (2) offers considerable resistance to impacts, (3) delays and diffuses the impact shock by increasing the inline distance over which the shock must travel, and (4) acts as a cushion or spring in absorbing and spreading the impact over a large number of pressure resilient members and assemblies.

The present collision guard comprises one or more collision guard units, each of which comprises a loop that is affixed to a stationary object such as an auto bumper, a pier post or wall, a highway divider, or a boat. Between each of said loops and the surface to be protected, there is secured a cylinder of pressure-resistant rubber that is closely surrounded by a high tension coil spring. Each rubber cylinder is disposed so that its axis is in the direction of movement of the vehicle and in the horizontal plane of the expected impact. Where a plurality of collision units are utilized, they are laterally connected through a plurality of cross-members which provide the surface to be protected with a continuity of protection while serving to distribute the force of impact over a wide area.

BRIEF DESCRIPTION OF THE DRAWINGS

FIG. 4a is a cross-sectional view of FIG. 4 taken along line 4a—4a;

FIG. 5a is a cross-sectional view of FIG. 5 taken along 5a—5a.

DESCRIPTION OF THE PREFERRED EMBODIMENTS

Figure 1:
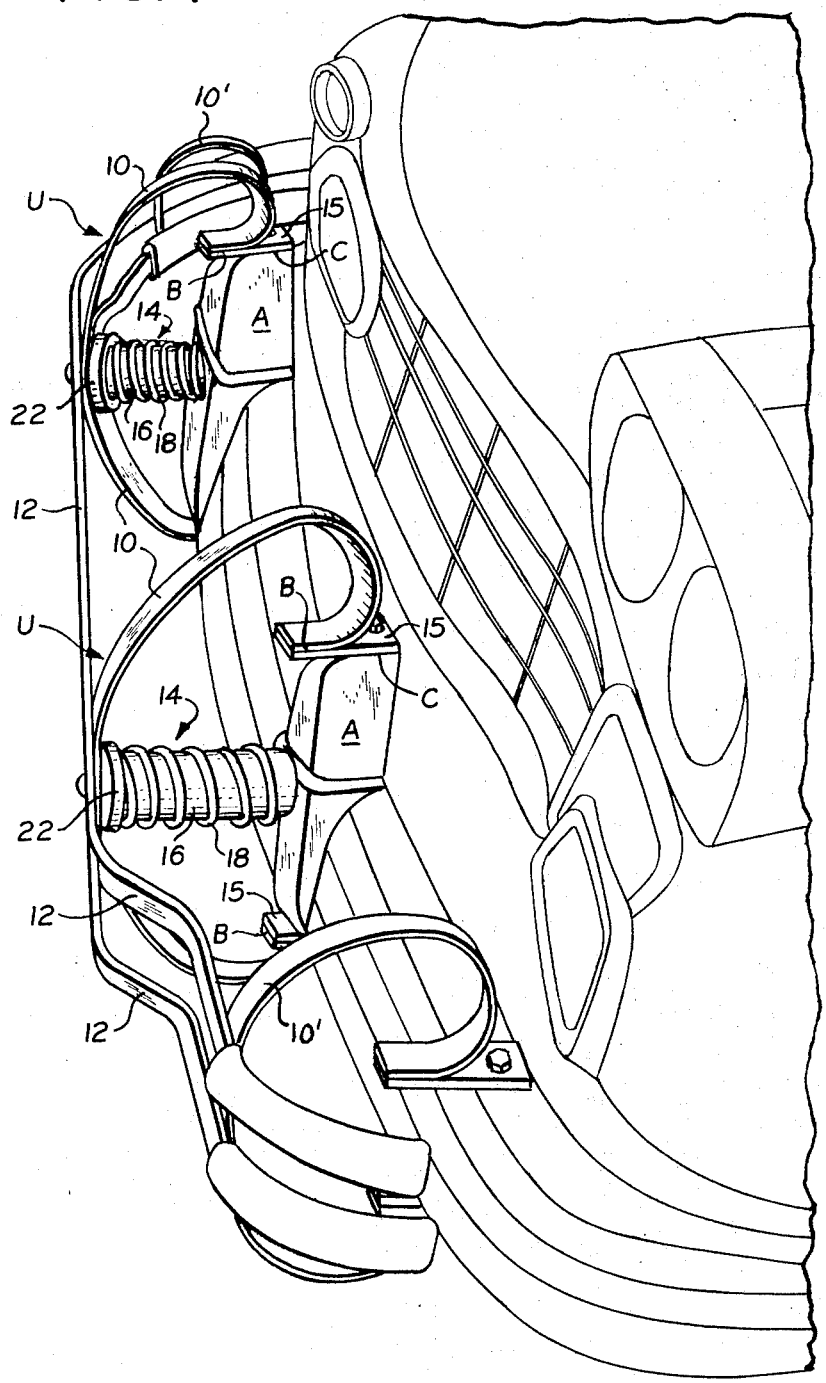
FIG. 1 is a perspective view of the present invention showing a plurality of collision guard units in association with the front bumper of an automobile.
Figure 2:
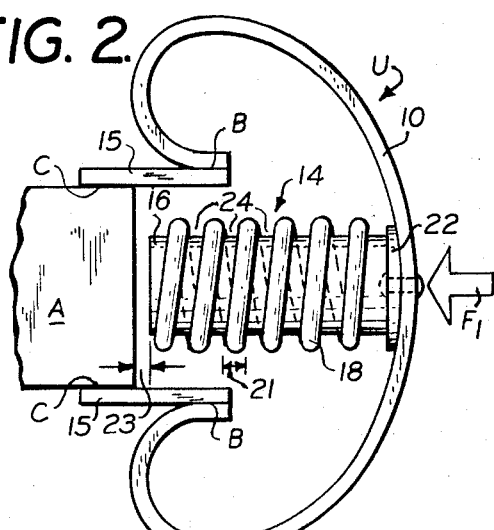
FIG. 2 is a side elevational view of one of the collision guard units shown in FIG. 1.

Referring to FIG. 1, the present collision guard system is seen in conjunction with the front bumper of an automobile A. As can be seen, the collision guard system is comprised of a plurality of collision guard units U. A representative unit is illustrated in FIG. 2 which shows an impact loop 10 and an absorption assembly 14. The impact loop 10 has two opposite ends which are curled inwardly and may be welded or bolted at point B to a pair of horizontal members 15 that are welded or bolted to the surface A at points C. The securements at points B and C must be of sufficient strength to withstand the impact of any force that the loop 10 is likely to be exposed to.

Figure 3:
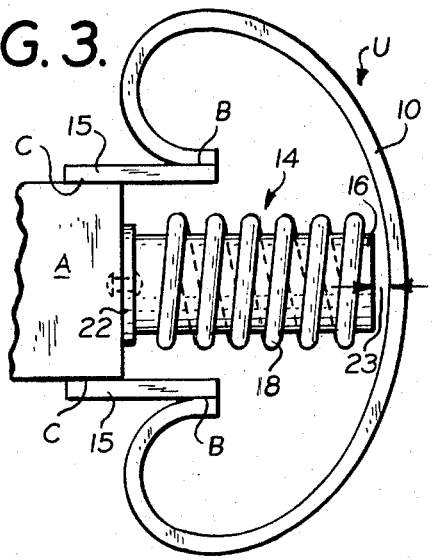
FIG. 3 is a side elevational view of another embodiment of a collision guard unit.

The assembly 14 is comprised of (1) a cylindrical core 16, formed of a resilient material, and (2) a high-tension coil spring 18 which closely surrounds the core 16. Both the core and the spring are affixed to an end plate 22 which, as shown in FIG. 2, may be bolted to the inside of the impact loop 10. Alternatively, as shown in FIG. 3, the end plate 22 may be bolted to the surface A that is to be protected. In either embodiment, the absorption assembly 14 performs a similar function.

It can be seen in FIGS. 2 and 3 that the cylindrical core 16 is longer than the spring 18. This design allows the core to become compressed into a highly resilient state by the time that the spring has dynamically entered the system. Also, and as will be later described, the present absorption assembly design produces a novel interaction between the spring 18 and the core 16, thereby greatly increasing the resilient properties of the assembly.

A desirable core length would be one exceeding the spring length by between one-half and one spring width 21. A material which has been found to be suitable as a core material is a rubber having a resilience of between 50 and 80 durometers. The spring 18 may be formed of ¼ to ½ inch steel having between 10 and 14 turns per foot and an internal diameter of between 2 and 4 inches. In addition, the spring should have a compression strength of between 500 and 100 lbs per inch of displacement.

The impact loop 10 is preferably formed of high strength carbon steel and has, in one embodiment, a greatest longitudinal (or vertical) dimension of about 21 inches and a greatest horizontal dimension of about 10 inches, with a width of 1½ inches and a cross section of ¼ inch. The ratio of the major axis of said loop to its minor axis may vary between 2 and 4:1.

A desirable gap width 23, between the end of the core 16 and the protected surface A, would be a width approximately equal to the core's extension beyond the spring. Such a gap width serves to increase the horizontal distance over which an impulsive force must travel and to thereby enhance the dissipative capacity of the bumper guard unit without compromising its structural stability.

The functions of, and inter-relationships between, the loop 10, the assembly 14 and the surface A can be understood through an examination of the behavior of a single collision guard unit during a collision. Referring again to FIG. 2, the impact force F, is represented by the arrow pointing to the left. Every impact force must possess a particular mass (M) and a velocity (V). It is these two factors that determine the momentum (MV) of the impact. Since the total momentum of a system must remain constant, it follows that all of the momentum of the force F, must, in some combination, be transferred to the impact loop 10, the absorption assembly 14 and, in the event of a sufficiently high impact, to the protected surface A.

In addition to the factors of mass and velocity, a third factor, time, also plays an important role in determining the effect which the impact force $F_1$ will have on a system. More particularly, it is noted that the integrated effect of momentum (MV) over time is termed kinetic energy ($½ MV^2$). In other words, it is the time over which a system is exposed to a given impact that will determine the amount of energy that is imparted to the struck object. Accordingly, the time interval of impact will also determine the level of energy that a collision guard system must be capable of absorbing and dissipating.

Figure 4:
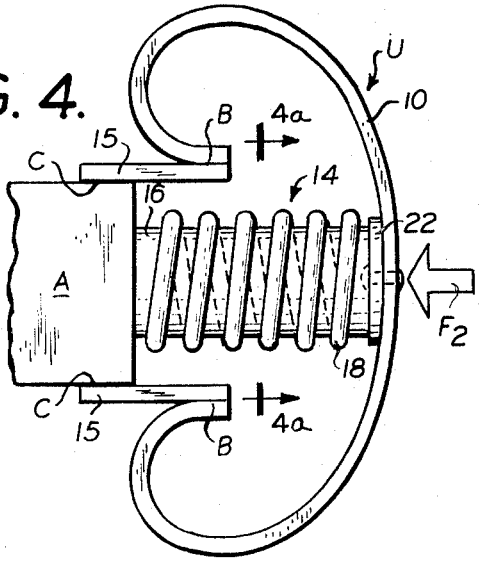
FIG. 4 is a side elevational view similar to FIG. 2 at the point at which the absorption assembly engages the surface to be protected.
Figure 5:
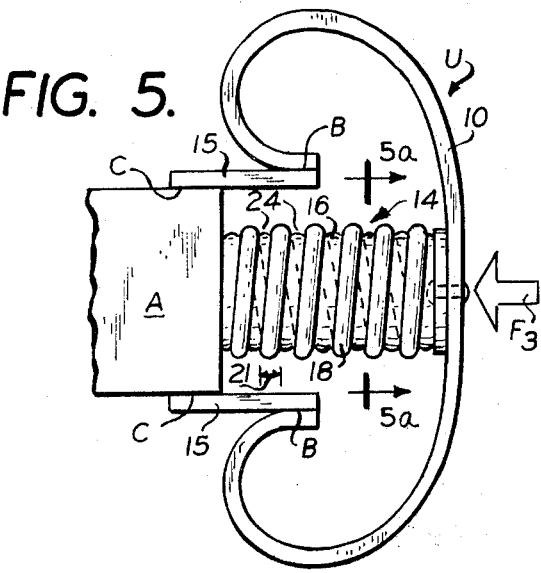
FIG. 5 is a side elevational view similar to FIG. 2 at the point at which the absorption assembly is partially compressed.

In FIGS. 2, 4 and 5, there is shown a force-time sequence that the impact loop 10 and absorption assembly 14 of the collision guard unit U, having the characteristics above described, might experience during a collision. $F_1$ is the force at the instant of impact with the loop 10. Just prior to this time, the loop and the absorption assembly are in a quiescent state. $F_2$ (see FIG. 4) is the force at the initial instant of engagement of the absorption assembly with surface A. During the time between $F_1$ and $F_2$, the loop 10 has started to absorb and dissipate the initial force $F_1$. By the time of force $F_2$ considerable deformation of the loop has occurred.

Figure 4A:
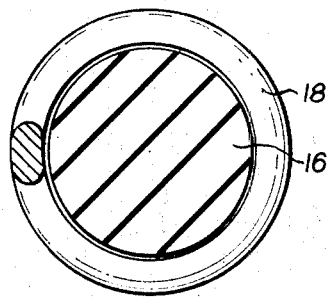

As the deformation occurs, the loop 10 absorbs and dissipates considerable quantities of energy. Hence, $F_2$ possesses a lesser magnitude than the preceding force $F_1$. It is also noted that at the time of force $F_2$, the absorption assembly has been pressed into contact with the surface A but the core 16 has not however begun to deform, that is, the spring 18 is still in its initial closely wound state about the core 16. (See cross-sectional view of FIG. 4a.)

Figure 5A:
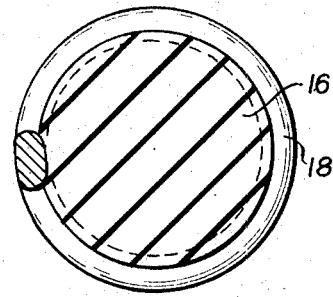

At force $F_3$ (see FIG. 5) the absorption assembly has already begun to deform, absorbing energy and transferring momentum in the process. As the spring 18 is axially compressed, the core 16 expands radially, attempting to squeeze into the helical spaces 24 between the coils of the spring. The pressure, both radial and axial, generated during this expansion works against the axial compression of the spring and thereby greatly increases the effective compression strength of both the spring and the entire collision guard unit. In order to derive a maximum benefit from this phenomenon, it is necessary that the helical spaces 24 be of sufficient width to permit adequate expansion of the core (See FIG. 5a). However, excessive width is also to be avoided in order to obtain the full benefit of the spring's resilience. A suitable space width 24 would lie between one-half and one coil width 21.

Soon after $F_3$, the absorpiton assembly will be forced into its most compressed position. After this time, any residual force will be imparted to the surface A. In most collisions the residual force, if any exists, will be a small fraction of the initial impact force $F_1$. Consequently, the surface A will have been effectively protected from the impulsive force of the collision.

A collision guard system may, as shown in FIG. 1, utilize a plurality of collision guard units interconnected by two transverse connecting members 12. These members distribute the force of impact among the several collision guard units and, in addition, spread the impulsive force of a collision over a wider area, serving to expand the area of the surface that can be protected. Furthermore, the transverse members 12 exert an angular inertia on the collision loops 10, thereby serving to resist the force F and to thereby increase the effective resilience of each collision guard unit U.

If desired, there may be provided additional loops 10' which serve to secure transverse members 12 to the bumper and also to absorb part of the impact force, said loops 10' differing from loops 10 in that they are not provided with absorption assemblies.

While the impact loop 10 has been described in the preferred embodiment as having its curled ends secured to surface A through the intermediary of horizontal members 15, it will be understood that such curled ends may be directly secured to surface A with the absorption assembly positioned in the same relative relation between the loop and the surface A.

While there is herein shown and described the preferred embodiments of the invention, it will be understood that the invention may be embodied otherwise than as herein specifically illustrated or described, and that in the illustrated embodiments certain changes in the details of construction and in the form and arrangement of parts may be made without departing from the underlying idea or principles of this invention within the scope of the appended claims.

Having thus described my invention, what I claim and desire to secure by Letters Patent is:

1. A collision guard unit, comprising
a. a first member defining a surface to be protected;
b. a second member defining an impact loop having its opposite ends secured in fixed relation with said first member;
c. an energy absorption assembly permanently secured at one end thereof to said impact loop, and having the other end disposed at a fixed distance from said surface to be protected;
d. said energy absorption assembly comprising
   1. a core formed of a solid, resilient, shock absorbent material; and
   2. a high tension coil spring closely surrounding said core such that said core upon compression may expand between the coils of said spring, thereby enhancing the resilient properties of both the spring and the entire unit;
e. the length of said core exceeding the length of said spring by between one-half and one diameter of a coil of said spring, and the length of said fixed distance being equal to between one-half and one diameter of a coil of said spring, whereby any force incident upon said loop will be largely absorbed and dissipated by the combined operative function of said loop and said assembly, thereby largely protecting said surface from the impact force.

2. A collision guard unit, comprising:
a. a first member defining a surface to be protected;
b. a second member defining an impact loop having its opposite ends secured in fixed relation with said first member;
c. an energy absorption assembly permanently secured at one end thereof to said surface to be protected, and having the other end disposed at a fixed distance from said impact loop;
d. said energy absorption assembly comprising
   1. a core formed of a solid, resilient, shock absorbent material; and
   2. a high tension coil spring closely surrounding said core such that said core upon compression may expand between the coils of said spring, thereby enhancing the resilient properties of both the spring and the entire unit;
e. the axial length of said core exceeding the axial length of said spring by between one-half and one diameter of a coil of said spring, and the length of said fixed distance being equal to between one-half and one diameter of a coil of said spring, whereby any force incident upon said loop will be largely absorbed and dissipated by the combined operative function of said loop and said assembly, thereby largely protecting said surface from the impact force.

3. The unit as recited in claim 1, in which the ratio of the major axis of said loop to the minor axis of said loop is at least 2:1 and does not exceed 4:1.

4. The unit as recited in claim 2, in which the ratio of the major axis of said loop to the minor axis of said loop is at least 2:1 and does not exceed 4:1.

5. The unit as recited in claim 1, in which said core is formed of high impact rubber, and said coil is formed of high tension steel.

6. The unit as recited in claim 2, in which said core is formed of high impact rubber, and said coil is formed of high tension steel.

* * * * *